United States Patent [19]

Yamamoto et al.

[11] 4,042,675
[45] Aug. 16, 1977

[54] PROCESS FOR TREATING THE MOTHER LIQUOR BY pH ADJUSTING IN THE PRODUCTION OF ANHYDROUS SODIUM DITHIONITE

[75] Inventors: Kousuke Yamamoto; Shinji Takenaka; Kazuo Maeda; Michio Mituta, all of Ohmuta, Japan

[73] Assignee: Mitsui Toatsu Chemicals, Incorporated, Tokyo, Japan

[21] Appl. No.: 687,448

[22] Filed: May 18, 1975

[30] Foreign Application Priority Data

May 21, 1975 Japan .................................. 50-59569

[51] Int. Cl.² ............................................. C01B 17/66
[52] U.S. Cl. ................................ 423/515; 260/488 F; 423/184; 423/199; 423/512 A; 423/514; 203/74; 423/551
[58] Field of Search ............... 423/512, 514, 515, 551, 423/184, 198, 199; 260/488 F; 203/74, 14

[56] References Cited

U.S. PATENT DOCUMENTS

| 3,718,732 | 2/1973 | Winslow et al. ................. 423/515 X |
| 3,961,034 | 6/1976 | Bostian et al. .................. 423/515 X |

FOREIGN PATENT DOCUMENTS

| 47-17132 | 5/1972 | Japan ..................................... 423/515 |
| 47-16413 | 5/1972 | Japan ..................................... 423/515 |

Primary Examiner—Jack Cooper
Attorney, Agent, or Firm—Sherman & Shalloway

[57] ABSTRACT

In the production of anhydrous sodium dithionite by reacting sodium formate, an alkaline sodium compound and sulfurous acid anhydride in hydrous methanol, a process for treating the mother liquor, which comprises adding an alkali to the mother liquor left after the separation of the resulting anhydrous sodium dithionite to adjust its pH to at least 8, separating the solids precipitated, and oxidizing the filtrate with an oxidizing agent.

10 Claims, No Drawings

PROCESS FOR TREATING THE MOTHER LIQUOR BY pH ADJUSTING IN THE PRODUCTION OF ANHYDROUS SODIUM DITHIONITE

This invention concerns an improvement in and relating to a process for preparing anhydrous sodium dithionite (to be referred to as hydrosulfite) by reacting sodium formate, an alkaline sodium compound and sulfurous acid anhydride in hydrous methanol, and more specifically, to a process for treating the mother liquor left after separation of hydrosulfite in the above process in order to recover the unreacted sodium formate and methanol and use them effectively in the subsequent reaction.

A number of suggestions have been made as to a process for preparing hydrosulfite by reacting sodium formate, an alkaline sodium compound and sulfurous acid anhydride in hydrous methanol. Generally, the amount of sodium formate consumed in this reaction is less than 60% of the sodium formate used, and most of the remainder is left unreacted in the mother liquor. It is desirable both economically and for the purpose of reducing COD in the waste water to recycle the mother liquor and effectively use the unreacted sodium formate and methanol present in it.

Recycling of the mother liquor, however, poses the following problems. Generally, in a reaction of forming hydrosulfite, sodium thiosulfate is generated by a side-reaction and contained in the mother liquor. The sodium thiosulfate decomposes hydrosulfite in the production of hydrosulfite, and promotes the formation of by-product sodium thiosulfate. For this reason, when the mother liquor is directly recycled, the amount of sodium thiosulfate formed increases in the reaction system of forming hydrosulfite, and the yield of the hydrosulfite decreases drastically.

Our experiments have ascertained that the allowable amount of sodium thiosulfate in the reaction system for producing hydrosulfite is not more than 1.5% by weight (all percentages appearing hereinafter are by weight), preferably not more than 0.7%, based on the starting sodium formate in the case of a general batch-wise method. When sodium thiosulfate is added to the reaction system in an amount of more than 4% based on the starting sodium formate, no hydrosulfite can be obtained. When sodium thiosulfate is added to the reaction system in an amount of 1.0%, and 0.5% based on the starting sodium formate, the yield of hydrosulfite decreases to 90% and 95%, respectively, of the yield obtained without the addition of sodium thiosulfate. In a continuous method, the allowable amount of sodium thiosulfate is smaller, and needs to be not more than 0.3% based on the starting sodium formate.

Accordingly, when the mother liquor is to be recycled, it is necessary to remove sodium thiosulfate from it prior to recycling. In an attempt to achieve it, the recycling of the mother liquor after decomposition and removal of sodium thiosulfate contained in it (Japanese patent publication No. 16413/72), and the method comprising converting the unreacted sodium formate to methyl formate, recovering the methyl formate by distillation and recycling the recovered methyl formate (West German OLS No. 2,215,116; Japanese patent publication No. 17132/72), for example, have been suggested. These methods, however, suffer from disadvantages. For example, (1) a great amount of the mother liquor should all be treated by distillation; (2) after recovery of methyl formate, the mother liquor becomes a slurry containing large quantities of solids precipitated, and is difficult to handle; and (3) sometimes, sulfur gets mixed with the methyl formate recovered, and causes a decrease in the yield of hydrosulfite.

We investigated the method of removing sodium thiosulfate from the mother liquor in order to enable the mother liquor to be recycled for further use, and found the following facts.

1. When an alkali is added to the mother liquor to adjust its pH to at least 8, sodium thiosulfate precipitates together with sulfite salts and thus precipitates efficiently from the mother liquor. Filtration enables the sodium thiosulfate to be removed together with the sulfite salts from the mother liquor.

2. By oxidizing the filtrate with an oxidizer, a small amount of sodium thiosulfate still dissolved in it can be changed to sodium sulfate which is not detrimental to the production of hydrosulfite. As a result, the mother liquor free from sodium thiosulfate can be obtained.

These discoveries led to the accomplishment of the present invention.

It is an object of this invention to provide a process for effectively removing sodium thiosulfate from the mother liquor left after the separation of hydrosulfite in the production of hydrosulfite by reacting sodium formate, an alkaline sodium compound and sulfurous acid anhydride in hydrous methanol.

The above object can be achieved by adding an alkali to the mother liquor to adjust its pH to at least 8, separating the precipitated solid by filtration, and oxidizing the filtrate with an oxidizing agent.

In this invention, the alkaline sodium compound means sodium hydroxide, sodium carbonate and sodium bicarbonate, and sodium hydroxide is preferred.

In this invention, the removal of sodium thiosulfate from the mother liquor is achieved by adding an alkali to the mother liquor to adjust its pH to at least 8, separating the precipitated solid by filtration, and oxidizing the filtrate with an oxidizer. Usually, the mother liquor left after the separation of hydrosulfite is neutral to weakly acidic, and generally consists of, by weight, 2.5 to 6% of acidic sodium sulfite, 0.4 to 5.0% of sodium thiosulfate, 2.5 to 8% of sodium formate, 64 to 78% of methanol, and 17 to 25% of water.

The alkali used in this invention includes alkali metal hydroxides and alkaline earth metal hydroxides. Of these, sodium hydroxide and potassium hydroxide are preferred. The sodium hydroxide is especially preferred. The alkali can be added either as such or as an aqueous solution. Sodium hydroxide is used preferably as an aqueous solution having a concentration of at least about 40%, especially 45 to 55%. When the amount of the alkali is small and the pH of the mother liquor does not reach 8, the precipitation of solids tends to become insufficient. On the other hand, when the alkali is added in an amount more than necessary, no special effect is obtained, and the alkali becomes waste. Furthermore, when the alkali is added as an aqueous solution, it may unfavorably result in a high water content of the mother liquor. Generally, it is not necessary to raise the pH of the mother liquor beyond 12. Operationally, it is preferred that the alkali be added so as to adjust the pH of the mother liquor to 9-11.

When the pH of the mother liquor is raised to at least 8, acid sodium sulfite in the mother liquor precipitates as a salt of an alkali metal or alkaline earth metal with sulfurous acid, for example, sodium sulfite, and sodium thiosulfate, by coprecipitation, also precipitates together with the sulfite salt. Since the temperature dependence of the solubility of the sulfite salt is small, the precipitation of the sulfite by addition of an alkali to the mother liquor can be performed over a broad temperature range. For the convenience of the treating procedure, however, it is preferred to perform it at a temperature of 20° to 60° C, especially 30° to 50° C. When the treatment is carried out within this temperature range, the filtrability of the precipitated solid (the sulfite salt containing sodium thiosulfate) is good, and it can be smoothly separated from the mother liquor by filtration. The treatment can be performed without stirring, but preferably with a moderate degree of stirring. Precipitation of the sulfite salt is rapid and substantially ends as soon as the alkali is added to the mother liquor to adjust its pH to at least 8.

In this way, the precipitated solid consisting of the sulfite salt and sodium thiosulfate is separated by filtration from the mother liquor. The resulting filtrate (to be referred to as the alkali-treated mother liquor) has a content of sodium thiosulfate decreased to 0.2 to 0.7%. It also contains the sulfite salt dissolved therein in a concentration of 0.04 to 0.4%.

In the next step of the process, the alkali-treated mother liquor is oxidized with an oxidizing agent. When the alkali-treated mother liquor, in an alkaline condition, is oxidized with an oxidizing agent, the sulfite salts and sodium thiosulfate dissolved therein in small amounts are both oxidized to sulfate salts. The oxidizing agent that can be used includes hypochlorites, chlorine, ozone, and hydrogen peroxide. The ozone and hydrogen peroxide are most feasible.

When oxygen or air is used as the oxidizing agent, the sulfite salt is readily oxidized to a sulfate, but sodium thiosulfate does not undergo oxidation. Accordingly, the use of oxygen or air alone does not suit the purpose of this invention. But since it can easily oxidize the sulfite salt, it can be used conjointly with other oxidizing agents, or after oxidizing with oxygen, the product is further treated with other oxidizing agents. This can reduce the amount of the oxidizer.

Preferably, the oxidizing agent is used in an amount which is substantially equal to the total sum of the amount stoichiometrically required to oxidize the sulfite salt in the alkali-treated mother liquor to a sulfate, and the amount stoichiometrically required to oxidize the sodium thiosulfate in the alkali-treated mother liquor to sodium sulfate. For example, when hydrogen peroxide is used, 1 mole of it is stoichiometrically required per mole of the sulfite salt, and 4 moles of it, per mole of the sodium thiosulfate. Preferably, therefore, the hydrogen peroxide is added to the alkali-treated mother liquor in an amount substantially equal to the total sum of these stoichiometric amounts, that is, about 5 moles of the hydrogen peroxide is added to the alkali-treated mother liquor containing 1 mole each of the sulfite salt and the sodium thiosulfate. When the amount of the oxidizing agent is smaller, the unreacted sodium thiosulfate remains unfavorably. When the amount of the oxidizing agent is excessive, it causes the decomposition of hydrosulfite when recycling the mother liquor. Accordingly, in such a case, it is desirable to add a small amount of sodium sulfite to decompose the excess of the oxidizing agent. Since, however, ozone spontaneously decomposes within short periods of time, it needs not to be decomposed by adding sodium sulfite.

Oxidation is carried out generally at a temperature of 20° to 60° C, preferably 40° to 50° C, and the time required is 1 to 4 hours.

The solubility of the sulfate salts formed by oxidizing the alkali-treated mother liquor in this manner is generally 0.3 to 0.6%. Thus, at the end of the oxidation, small amounts of sulfates precipitate as solids. The solids are then separated by filtration. The residue left after the separation of the sulfates is substantially an aqueous-methanolic solution of sodium formate which does not contain sodium thiosulfate although containing traces of the sulfates. It can therefore be recycled as a raw material and solvent for the production of hydrosulfite. As the amount of the sulfate precipitated at the end of the oxidation is small, its separation can be omitted.

In a modification of the above procedure, the alkali-treated mother liquor is first distilled to recover methanol, and the residue is oxidized with an oxidizing agent. According to this procedure, a large quantity of methanol must be recovered completely, but it offers some advantages: the amount of the liquor to be oxidized decreases to facilitate the oxidizing procedure; the oxidation is carried out in aqueous solution, and the danger is reduced; methanol and sodium formate can be separately recovered; and COD is low, and these is no likelihood of pollution by the waste water.

It is not impossible to oxidize the mother liquor without adding an alkali. This procedure, however, requires a large amount of the oxidizing agent because the substance to be oxidized is present in a large amount. Furthermore, since this procedure involves the oxidation of sodium thiosulfate in an acidic condition, by-product sodium polythionate occurs in a large quantity. This by-product exhibits the same behavior as sodium thiosulfate toward the reaction of forming hydrosulfite. The sodium polythionate should therefore be completely oxidized to sodium sulfate. The rate of oxidizing sodium polythionate is extremly low, and it is very difficult to remove it completely. It should be understood that alkalidication of the mother liquor by addition of alkalies in the process of this invention serves not only to reduce the amount of the substances to be oxidized, which are present in the mother liquor, by precipitating and separating the sulfite salts and sodium thiosulfate, but also to facilitate the complete oxidation of sodium thiosulfate.

The mother liquor from which sodium thiosulfate has been removed can be recycled to the production of hydrosulfite in the various ways described below.

According to one method, a part, for example, about 60 to 80%, of the mother liquor deprived of sodium thiosulfate is directly recycled so as to maintain the concentration of water in the reaction system for producing hydrosulfite at a constant value, and the remainder is discarded, or sent to another recovery step for recovering methanol and sodium formate. Another method comprises adding an acid to the mother liquor deprived of sodium thiosulfate to acidify it and thereby to convert sodium formate to methyl formate. In this case, a large quantity of the liquor must be completely distilled. However, since the mother liquor deprived of sodium thiosulfate contains little or no sodium thiosulfate, there is no trouble such as the precipitation of elemental sulfur as a result of acid decomposition of sodium thiosulfate. Since the amount of a solid therein is small, it can be very easily treated. According to still another method, the mother liquor deprived of sodium thiosulfate is entirely subjected to distillation to distill out and recover methanol, and the distillation residue is further concentrated by distillation under reduced pressure to crystallize out and recover sodium formate, and the methanol and sodium formate thus recovered are recycled to the production of anhydrous sodium dithionite. According to the process of this invention, sodium thiosulfate in the mother liquor can be efficiently removed by a very simple operation. This permits very easy recycling of the mother liquor. The oxidation in accordance with the method of this invention is carried out under alkaline conditions subsequent to the treatment of the mother liquor with alkalies. Hence, the amount of expensive oxidizing agents can be reduced, and there is no likelihood of the formation of sodium polythionate which impedes the formation of hydrosulfite.

When sodium formate in the mother liquor is recovered as methyl formate in the process of this invention, the liquor to be distilled no longer contains sodium thiosulfate and acidic sodium sulfite as a result of treating the mother liquor with alkalies. Hence, there is no operational trouble such as the precipitation of large amounts of the solid matter from mother liquor after the recovery of methyl formate. Furthermore, in this case, there is no likelihood of precipitation of elemental sulfur as a result of the decomposition of sodium thiosulfate with acids. The allowable amount of elemental sulfur in the reaction system for producing hydrosulfite is less than 50 ppm, and when the elemental sulfur exists in a larger amount, the decomposition of hydrosulfite is promoted, and the yield of hydrosulfite decreases drastically. In the conventional method in which the filtrate is directly acidified to convert it to methyl formate, the inclusion of elemental sulfur in the resulting methyl formate cannot be avoided. Thus, when the methyl formate is directly recycled, the yield of the hydrosulfite decreases drastically. Where the sulfur content is high, it is frequently impossible to obtain the final desired product. The process of the present invention, however, is completely free from these defects.

The following Examples illustrate the process of this invention further. Unless otherwise indicated, all percentages in these examples are by weight.

EXAMPLE 1

20 g of a 47.8% aqueous solution of sodium hydroxide was added at 20° C to 200 g of the mother liquor obtained by reacting sodium formate, sodium hydroxide and sulfurous acid anhydride in hydrous methanol and separating the resulting hydrosulfite, to adjust the pH of the mother liquor to 9.5. The precipitate was separated by filtration. The filtrate contained 0.51% of sodium thiosulfate, 0.04% of sodium sulfite, and 8.41% of sodium formate with sodium trithionate undetected.

60 liters of air containing 1.5% by volume of ozone was blown at 50° C into this filtrate over the course of 3 hours. After this oxidation treatment, sodium thiosulfate and sodium sulfite were not detected in the oxidized product, and it contained 0.08% of sodium trithionate and 8.37% of sodium formate.

EXAMPLE 2

In the same way as in Example 1. the mother liquor was treated with the same alkali to adjust its pH to 9.5, and the precipitate was separated by filtration. Methanol was first recovered from 200 g of the resulting filtrate. The remainder contained 1.61% of sodium thiosulfate, 0.12% of sodium sulfite, and 26.5% of sodium formate, and sodium trithionate was not detected.

60 liters of air containing 1.5% by volume of ozone was blown at 50° C into the resulting solution over the course of 3 hours. After the oxidation treatment, the solution contained 26.1% of sodium formate, while sodium thiosulfate, acid sodium sulfite and sodium trithionate were not detected.

EXAMPLE 3

In the same way as in Example 1, the mother liquor was treated with the same alkali to adjust its pH to 9.5, and the precipitate was separated by filtration. 6 g of 31% aqueous hydrogen peroxide was added to 200 g of the resulting filtrate, and the oxidation was performed at 50° C for 3 hours. The treated solution contained 0.02% of sodium trithionate and 8.34% of sodium formate, while sodium thiosulfate and sodium sulfite were not detected.

What we claim is:

1. In the process for the production of anhydrous sodium dithionite by reacting sodium formate, an alkaline sodium compound and sulfurous acid anhydride in hydrous methanol and recycling the mother liquor left after separation of anhydrous sodium dithionite product from the reaction mixture to the production of anhydrous sodium dithionite, by said reaction between sodium formate, an alkaline sodium compound and sulfurous acid anhydride in hydrous methanol, said mother liquor containing acid sodium sulfite, sodium thiosulfate, sodium formate, methanol and water the improvement comprising
1. adding an alkali to the mother liquor after said separation to adjust its pH to at least 8 to thereby coprecipitate sodium sulfite and sodium thiosulfate;
2. separating the coprecipitate solids by filtration;
3. oxidizing the resulting filtrate at a temperature of 20° to 60° C with an oxidizing agent selected from the group consisting of sodium hypochlorite, chlorine, ozone and hydrogen peroxide in an amount sufficient to oxidize sodium sulfite and sodium thiosulfate dissolved in the filtrate into sodium sulfate; and
4. recycling the oxidized filtrate to said production of anhydrous sodium dithionate.

2. The process of claim 1 wherein the amount of alkali added in step (1) is sufficient to adjust the pH of the mother liquor to 9–11.

3. The process of claim 2 wherein the alkali added in step (1) is sodium hydroxide and the oxidizing agent in step (3) is ozone or hydrogen peroxide and the oxidizing agent is added in an amount which is substantially equal to the total sum of the amount stoichiometrically required to oxidize the sulfite salt in the filtrate to sulfate salt, and the amount stoichiometrically required to oxidize the sodium thiosulfate in the filtrate to sodium sulfate.

4. The process of claim 1 wherein the alkali in step (1) is sodium hydroxide.

5. The process of claim 1 wherein the oxidizing agent in step (3) is hydrogen peroxide.

6. The process of claim 1 wherein between step (2) and step (3) the filtrate left after the separation of the precipitated solids by filtration in step (2) is distilled to recover methanol, and the distillation residue is oxidized as the filtrate in step (3).

7. The process of claim 1 wherein between step (3) and step (4) sulfates precipitated after oxidation with the oxidizing agent in step (3) are separated by filtration.

8. The process of claim 1 wherein the filtrate oxidized with the oxidizing agent in step (3) is recycled directly to said production of anhydrous sodium dithionite.

9. The process of claim 1 which further comprises between step (3) and step (4), adding an acid to the oxidized filtrate from step (3) to acidify it and to convert sodium formate to methyl formate, and recovering the methyl formate.

10. In the process for the production of anhydrous sodium dithionite by reacting sodium formate, an alkaline sodium compound and sulfurous acid anhydride in hydrous methanol and recycling the mother liquor left after separation of anhydrous sodium dithionite product from the reaction mixture to the production of anhydrous sodium dithionite by said reaction between sodium formate, an alkaline sodium compound and sulfurous acid anhydride in hydrous methanol, said mother liquor containing acid sodium sulfite, sodium thiosulfate, sodium formate, methanol and water the improvement comprising 1. adding an alkali to the mother liquor after said separation to adjust its pH to at least 8 to thereby coprecipitate sodium sulfite and sodium thiosulfate;
2. separating the coprecipitate solids by filtration;
3. oxidizing the resulting filtrate at a temperature of 20° to 60° C with an oxidizing agent selected from the group consisting of sodium hypochlorite, chlorine, ozone and hydrogen peroxide in an amount sufficient to oxidize sodium sulfite and sodium thiosulfate dissolved in the filtrate into sodium sulfate;
4. distilling the entire oxidized filtrate from step (3) to distill out and recover methanol;
5. thereafter further concentrating the distillation residue by distillation under reduced pressure to crystallize out and recover sodium formate; and,
6. recycling the recovered methanol and sodium formate to said production of anhydrous sodium dithionite.

* * * * *

UNITED STATES PATENT OFFICE
CERTIFICATE OF CORRECTION

Patent No. 4,042,675          Dated August 16, 1977

Inventor(s) Yamamoto, et al.

It is certified that error appears in the above-identified patent and that said Letters Patent are hereby corrected as shown below:

Claim 1, line 6, after "to", delete "the", insert --said--

Signed and Sealed this

Fourth Day of July 1978

[SEAL]

Attest:

RUTH C. MASON
Attesting Officer

DONALD W. BANNER
Commissioner of Patents and Trademarks